(12) United States Patent
Mei et al.

(10) Patent No.: US 10,378,582 B2
(45) Date of Patent: Aug. 13, 2019

(54) MAGNETIC BEARING AND ROTARY MACHINE COMPRISING SUCH A BEARING

(71) Applicant: Nuovo Pignone Srl, Florence (IT)

(72) Inventors: Luciano Mei, Florence (IT); Duccio Fioravanti, Florence (IT); Marco Romanelli, Florence (IT); Marco Anselmi, Florence (IT); Manuele Bigi, Florence (IT)

(73) Assignee: Nuovo Pignone SRL, Florence (IT)

( * ) Notice: Subject to any disclaimer, the term of this patent is extended or adjusted under 35 U.S.C. 154(b) by 98 days.

(21) Appl. No.: 14/653,492

(22) PCT Filed: Dec. 17, 2013

(86) PCT No.: PCT/EP2013/076806
§ 371 (c)(1),
(2) Date: Jun. 18, 2015

(87) PCT Pub. No.: WO2014/095788
PCT Pub. Date: Jun. 26, 2014

(65) Prior Publication Data
US 2016/0215817 A1   Jul. 28, 2016

(51) Int. Cl.
*F16C 32/04* (2006.01)
*H02K 1/02* (2006.01)
(Continued)

(52) U.S. Cl.
CPC ........ *F16C 32/0461* (2013.01); *F16C 32/047* (2013.01); *F16C 32/0476* (2013.01);
(Continued)

(58) Field of Classification Search
CPC .. H02K 7/09; H02K 3/44; H02K 5/02; H02K 15/12; H02K 1/02; H02K 15/02;
(Continued)

(56) References Cited

U.S. PATENT DOCUMENTS 4,180,296 A * 12/1979 Habermann ........ F16C 32/0459
  310/90.5
5,072,146 A * 12/1991 New ................... F16C 32/0442
  310/214
(Continued)

FOREIGN PATENT DOCUMENTS

CA    2682563 A1 *  5/2010 ............ F16C 32/047
EP    1 967 288 A2   9/2008
(Continued)

OTHER PUBLICATIONS

Unofficial English Translation of Chinese Office Action issued in connection with corresponding CN Application No. 201380067387.6 dated Feb. 6, 2017.

(Continued)

*Primary Examiner* — Thomas Truong
(74) *Attorney, Agent, or Firm* — Baker Hughes Patent Organization

(57) ABSTRACT

A magnetic bearing comprising a stator magnetic circuit secured to a stationary support device, the stator magnetic circuit comprising at least one coil and a ferromagnetic body placed in a protective annular support, the protective annular support leaving uncovered a surface of the ferromagnetic body and a surface of the at least one coil. The bearing also comprises at least one annular plug placed on the surface of the at least one coil which is left uncovered by the protective annular support, and the annular plug and the surface of the ferromagnetic body which is left uncovered by the protective annular support are coated by a protective layer.

19 Claims, 2 Drawing Sheets

(51) Int. Cl.
    *H02K 7/09*         (2006.01)
    *H02K 15/02*      (2006.01)
    *H02K 1/18*         (2006.01)
    *H02K 3/44*         (2006.01)
    *H02K 5/12*         (2006.01)

(52) U.S. Cl.
    CPC ................ *H02K 1/02* (2013.01); *H02K 1/18* (2013.01); *H02K 3/44* (2013.01); *H02K 5/12* (2013.01); *H02K 7/09* (2013.01); *H02K 15/02* (2013.01); *F16C 2300/42* (2013.01); *F16C 2360/00* (2013.01)

(58) Field of Classification Search
    CPC ......... H02K 5/128–1285; H02K 5/136; H02K 5/12; H02K 1/18; Y10T 29/49009; Y10T 29/49073; F16C 32/0461; F16C 32/0476; F16C 32/047; F16C 2360/00; F16C 2300/42
    USPC .................................... 310/90.5, 198, 85–89
    See application file for complete search history.

(56) References Cited

U.S. PATENT DOCUMENTS

| | | | | |
|---|---|---|---|---|
| 5,250,865 | A * | 10/1993 | Meeks | F16C 32/0476 310/90.5 |
| 5,969,452 | A | 10/1999 | Halsey | |
| 8,148,861 | B2 * | 4/2012 | Baudelocque | F04D 29/023 310/87 |
| 2008/0308425 | A1 * | 12/2008 | Mittendorf | C23C 18/32 205/187 |
| 2010/0141065 | A1 * | 6/2010 | El Baraka | H02K 3/38 310/71 |
| 2010/0187926 | A1 * | 7/2010 | Baudelocque | F16C 32/047 310/88 |
| 2010/0295395 | A1 * | 11/2010 | Baudelocque | F16C 32/047 310/86 |
| 2012/0169167 | A1 * | 7/2012 | Fan | F16C 32/0478 310/90.5 |
| 2013/0099612 | A1 * | 4/2013 | Baudelocque | F16C 32/047 310/86 |

FOREIGN PATENT DOCUMENTS

| | | | |
|---|---|---|---|
| EP | 1967286 A2 | 9/2008 | |
| EP | 2014792 A1 * | 1/2009 | ............. C23C 18/32 |
| EP | 2182230 A1 | 5/2010 | |
| EP | 2 448 088 A2 | 5/2012 | |
| EP | 2 450 585 A2 | 5/2012 | |
| FR | 2632354 A1 | 12/1989 | |
| JP | 2002333018 A | 11/2002 | |

OTHER PUBLICATIONS

International Search Report and Written Opinion issued in connection with corresponding PCT application No. PCT/EP2013/076806 dated Feb. 27, 20145.

Office Action and Search issued in connection with corresponding RU Application No. 2015122785 dated Oct. 5, 2017.

Decision to Grant issued in connection with corresponding RU Application No. 2015122785 dated Mar. 21, 2018.

* cited by examiner

MAGNETIC BEARING AND ROTARY MACHINE COMPRISING SUCH A BEARING

BACKGROUND

The embodiments disclosed relate generally to magnetic bearings for rotary machines having a rotor. In particular, the embodiments relate to magnetic bearings for rotary machines in which the rotor and the bearing are, in use, in contact with a fluid, for instance a gaseous atmosphere, that is corrosive, acid, or carrying particles. Some exemplary embodiments specifically relate to a rotary machine comprising such a magnetic bearing.

Use of magnetic bearings to rotary machines is becoming more and more widespread, in particular in case of corrosive fluid. When the operating fluid of the machine in which the bearing operates is either acid, or corrosive or carrying particles, it is essential to protect the coils of the magnetic bearing and the associated means, by using anti-corrosion protection technologies. An example of such a technology is the jacketed bearing in which the stator portion of the bearing is protected by a metal jacket made of a material that does not oxidize or corrode and in general does not suffer any phenomena related to the aggressiveness of the environment.

A jacket may be in the form of a plate welded to an annular support in which is placed a stator magnetic circuit comprising at least one coil and a ferromagnetic body. The annular support may be made of a stainless material, such as magnetic stainless steel. The jacket of closure plate may be made out of the same material as the annular support, or it may be of a different metallic material, such as nickel base alloy for example.

In order to withstand operating conditions (pressure, fast variations in pressure, temperature, ability to withstand corrosion and abrasion), the jacket generally presents thickness lying in the range of 0.3 to 1 mm or more, for instance in the range of 0.3 to 0.5 mm, i.e. similar to that of the airgap of the magnetic bearing (which is the distance between the stator magnetic circuit and a rotor armature of the bearing). The presence of such a jacket of non-magnetic material thus amounts to increasing the thickness of the airgap of the bearing, which leads to a significant limit on the load available from said bearing. Moreover, it does not totally ensure the lack of contacts between the jacket and the rotor armature of the magnetic bearing, in any conditions.

It is therefore desirable for the thickness of the jacket to be reduced and for the jacket to be constituted by a fine metal sheet. Nevertheless, it requires the use of specific materials having high mechanical properties and anti-corrosion properties, in order to ensure the protection of the stator magnetic circuit against corrosion and to keep the same shape and dimensions in operation.

Furthermore, the production of the jacket, after welding and final re-machining, does not allow to check the exact thickness of the jacket, and thus the actual airgap of the bearing.

SUMMARY OF INVENTION

An object of the present invention is to remedy the above drawbacks while keeping the benefit of the principle of jacketing bearings. In particular, one aim of the invention is to provide a magnetic bearing which is simpler to be built and having a higher loading capacity.

According to a first aspect, in an exemplary embodiment, a magnetic bearing for a rotary machine having a rotor comprises a stator magnetic circuit secured to a stationary support device. The stator magnetic circuit comprises at least one coil and a ferromagnetic body placed in a protective annular support, the protective annular support leaving uncovered a surface of the ferromagnetic body and a surface of the at least one coil. The bearing may also comprise at least one annular plug placed on the surface of the at least one coil which is left uncovered by the protective annular support, and the annular plug and the surface of the ferromagnetic body which is left uncovered by the protective annular support are coated by a protective layer.

Thanks to the protective layer, the material of the plug may be chosen for its magnetic and mechanical properties: the properties against corrosion are no more relevant. The material of the plug and the material of the stator magnetic circuit are protected by the protective layer, against corrosion. In particular, the protective layer avoids wet $CO_2$ corrosion damages on carbon and low alloy steels, and avoids chlorides pitting corrosion damages on stainless steel. It is then possible to choose these materials (having the wanted magnetic and mechanical properties) for the plug. Moreover, when the material of the plug is a ferromagnetic material, it is no more necessary to have a thin plug to protect the coils: the plug may have a larger thickness than a standard jacket, which reduces the requirements of the material regarding the mechanical properties and the deformation of the plug in use, leading to a longer lifetime of the bearing and to a smaller airgap.

Therefore, thanks to the lack of a jacket and thus to the reduction of the airgap, the capabilities of the magnetic bearing of the invention are increased. Moreover, the protective layer can be easily refurbished, during a maintenance step, which allows to improve and to ease the serviceability of the bearing. Furthermore, the protective layer is cheaper than a standard jacket.

In some embodiments, the protective layer may comprise a layer of nickel.

Said layer of nickel may be formed by electroless-nickel plating.

Said layer of nickel may comprise nickel and phosphorus.

In some embodiments, the annular plug may comprise magnetic material chosen in the group of ferromagnetic material, magnetic stainless steel and nickel base alloy.

According to an embodiment, the bearing is an axial magnetic bearing. The bearing may comprise a rotor armature in the form of a disk secured to the rotor, and the stator magnetic circuit may be facing said rotor armature.

The rotor and the rotor armature may be, in use, in contact with a fluid, for instance a gaseous atmosphere, that is corrosive, acid, or carrying particles.

In some embodiments, the annular plug is brazed to the at least one coil, for instance by low temperature brazing.

In some embodiments, the annular plug may have a U section with a radial web and two axial flanges.

According to a further aspect, a rotary machine, for example a turbomachinery, may comprise a rotor and a bearing as previously defined.

According to a further aspect, a process to manufacture a bearing as previously described, may comprise the following steps of: a) welding the at least one annular plug to the at least one coil and/or to the ferromagnetic body, and b) coating the at least one annular plug and the surface of the ferromagnetic body which is left uncovered by the protective annular support with the protective layer.

In some embodiments, the process may also comprise, between steps a) and b), a step of re-machining the at least one annular plug and the surface of the ferromagnetic body which is left uncovered by the protective annular support to get a flat surface.

BRIEF DESCRIPTION OF THE DRAWINGS

Other characteristics used appear on reading the following description of a particular embodiment of the invention given as a non limiting example and with reference to the accompanying drawings, in which.

DETAILED DESCRIPTION

The following detailed description of the exemplary embodiments refers to the accompanying drawings. The same reference numbers in different drawings identify the same or similar elements. Additionally, the drawings are not necessarily drawn to scale.

Figure 1:
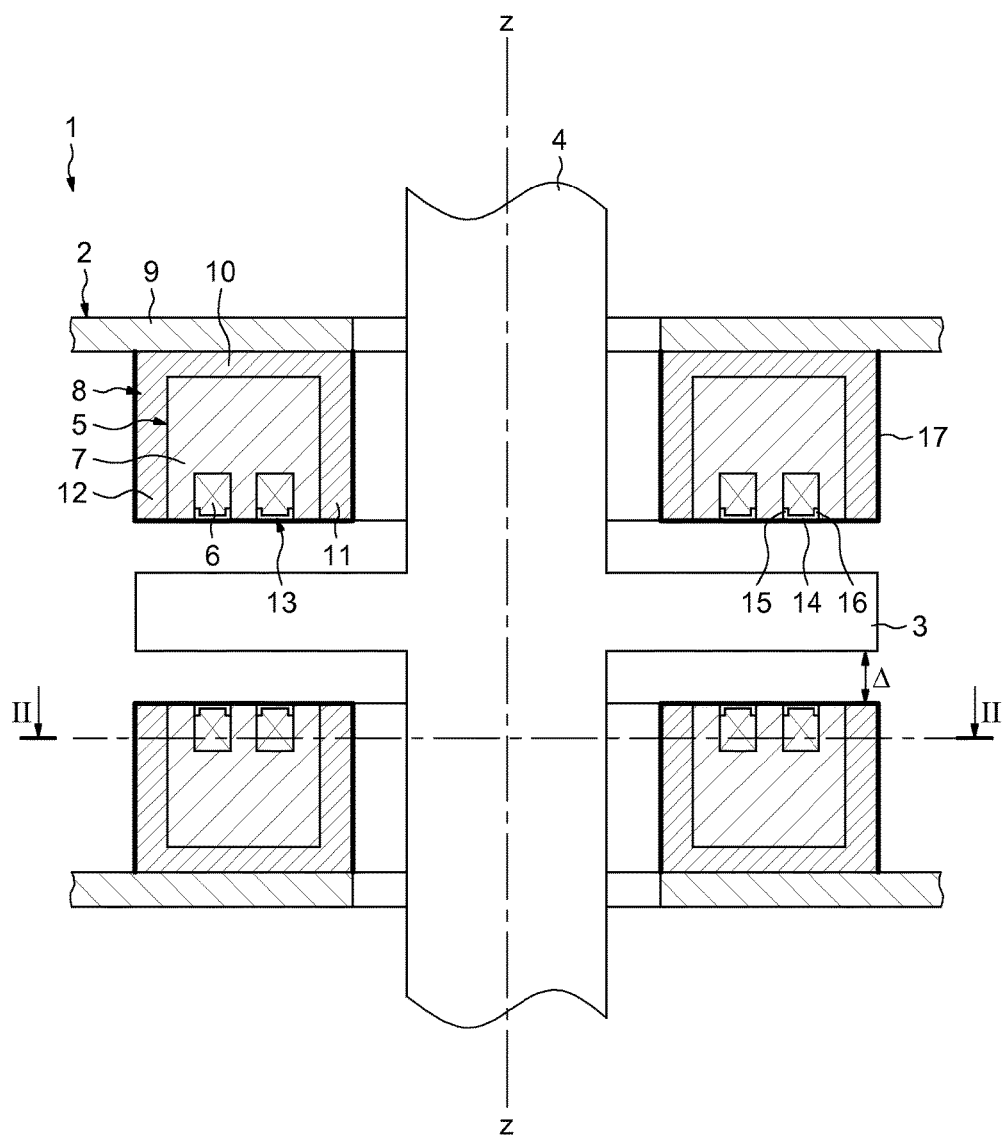
FIG. 1 is an axial section view on line I-I of FIG. 2, showing a magnetic bearing according to an exemplary embodiment.
Figure 2:
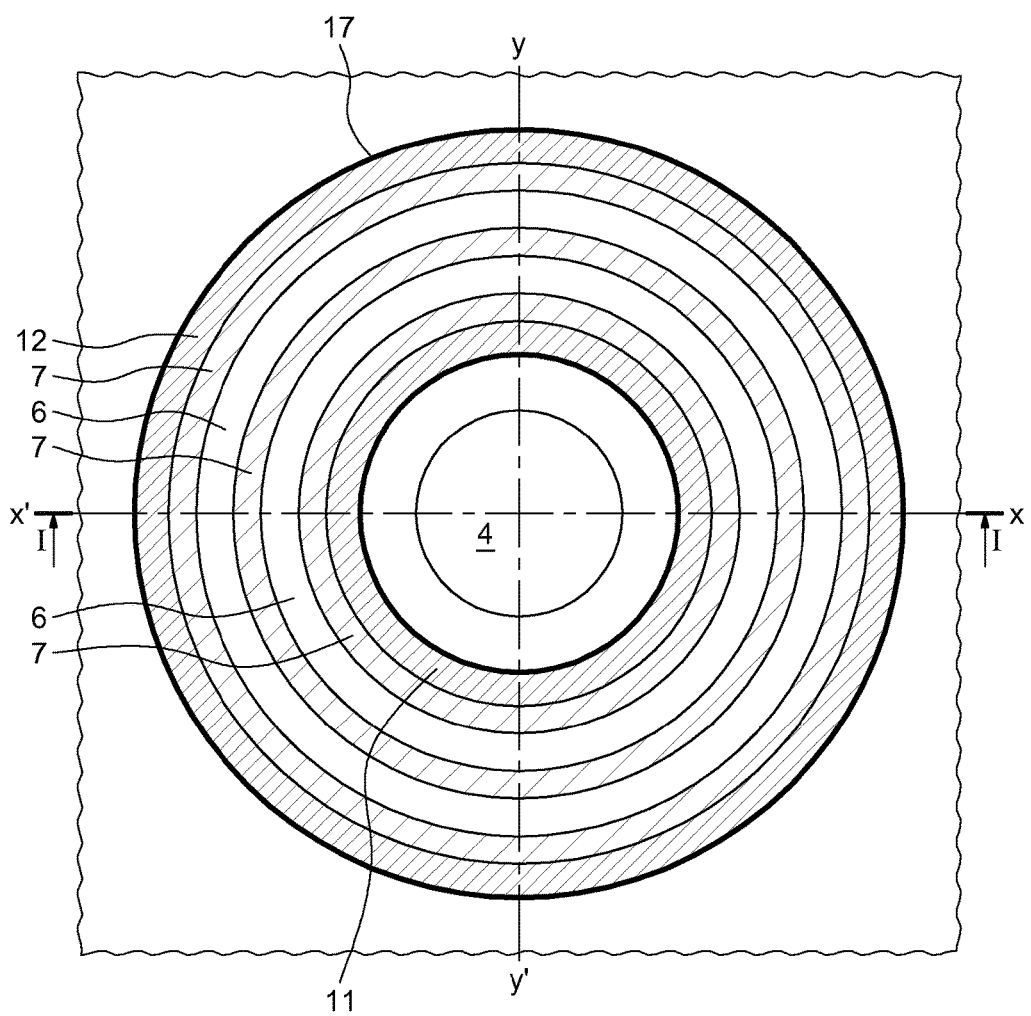
FIG. 2 is a radial section view on line II-II of FIG. 1.

FIGS. 1 and 2 show an exemplary embodiment of an axial magnetic bearing 1 of the present invention, for a rotary machine. The magnetic bearing 1 comprises a stator armature 2 and a rotor armature 3 in the form of a disk secured to a rotary shaft 4 of the rotary machine.

The stator armature 2 comprises a stator magnetic circuit 5 including, in conventional manner, one or more annular coils 6 and a ferromagnetic body 7. The ferromagnetic body 7 may be massive or it may be laminated locally. The stator magnetic circuit 5 is placed in a metallic protective annular support 8 that is itself secured to a stationary support device 9.

The stator magnetic circuit 5 is placed facing the rotor armature 3. The stator magnetic circuit 5 and its protective annular support 8 define an airgap Δ relative to the rotor armature 3. In some embodiments, the airgap Δ may lie in the range of 0.4 mm to 1.5 mm, and in some embodiment in the range of 0.4 mm to 1.2 mm.

The protective annular support 8 of the stator magnetic circuit 5 has a U section with a radial web 10 and inner and outer axial flanges 11 and 12. The length of the flanges 11 and 12 in the direction of the axis of the rotary shaft 4 is at least equal to the height of the ferromagnetic body 7 of the stator magnetic circuit 5. Therefore, the protective annular support 8 leaves uncovered a surface of the ferromagnetic body 7, in particular the surface of the ferromagnetic body 7 facing the rotor armature 3, and a surface of the one or more annular coils 6, in particular the surface of the one or more annular coils 6 facing the rotor armature 3.

The magnetic bearing 1 also comprises one or more annular plugs 13. The annular plugs 13 have a U section with a radial web 14 and inner and outer axial flanges 15 and 16. The annular plugs 13 are welded to the ferromagnetic body 7 by their flanges 15 and 16. The annular plugs 13 may also be brazed to the coils 6 by the use of low temperature brazing material. The annular plugs 13 are placed on the surface of the one or more coils 6 which is left uncovered by the protective annular support 8.

The annular plugs 13 may comprise magnetic material, for instance magnetic stainless steel, nickel base alloy such as Inconel® or, in an embodiment, ferromagnetic material such as carbon and low alloy steels. In particular, as the plugs are coated by a protective layer to be protected against corrosion, it is no more necessary to use materials with high properties against corrosion: the material of the plugs 13 is chosen according to its magnetic properties and its mechanical properties.

Moreover, as the surface of the ferromagnetic body 7 which is left uncovered by the protective annular support 8 and the external surface of the radial web 14 of the annular plugs 13 may be re-machined to get a surface with an improved flatness, the annular plugs 13 may have a thickness similar to or greater than the one of the protective annular support 8, in order to avoid any deformation of the annular plugs 13 under pressure.

The magnetic bearing 1 also comprises a protective layer 17. The aim of the protective layer 17 is to protect the stator magnetic circuit 5 against corrosion. The protective layer 17 is present on the surface of the ferromagnetic body 7 left uncovered by the protective annular support 8, and the external surface of the web 14 of the annular plugs 13. In other words, the protective layer 17 covers the surface of the stator armature 2 facing the rotor armature 3. The protective layer 17 may also cover the external surface of the flanges 11, 12 of the protective annular support 8.

In some embodiments, the thickness of the protective layer 17 may be in the range of 1 nm to 1 mm, and in an embodiment in the range of 100 nm to 10 μm.

In some embodiments, the protective layer 17 may be a layer of nickel. The layer of nickel may be formed by electroless-nickel plating. The layer of nickel may comprise nickel and phosphorus.

Thanks to the use of the annular plugs 13 and of the protective layer 17, it is possible to get a protection of the stator magnetic circuit 5 against corrosion, while keeping an airgap Δ between the stator magnetic circuit 5 and the rotor armature 3 smaller than in the magnetic bearings of the prior art. In particular, when the annular plugs 13 comprise ferromagnetic material, the airgap Δ is the sum of the distance between the protective layer 17 and the rotor armature 3, and of the thickness of the protective layer 17.

Moreover, thanks to the re-machining of the surface of the ferromagnetic body 7 together with the surface of the radial web of the annular plugs 13, and thanks to the coating by the protective layer, it is possible to get a surface with a high flatness facing the rotor armature 3, and then to reduce the airgap.

The above description is made with reference to an axial type magnetic bearing. However, it can be applied in like manner to a magnetic bearing of radial type or to a magnetic bearing of conical type combining the functions of a radial bearing and of an axial bearing.

The invention claimed is:

1. A magnetic bearing for a rotary machine having a rotor with an armature, the bearing comprising:
   a stator magnetic circuit secured to a stationary support device, the stator magnetic circuit comprising at least one coil and a ferromagnetic body placed in a protective annular support, the protective annular support leaving uncovered a surface of the ferromagnetic body and a surface of the at least one coil; and
   at least one annular plug disposed within the ferromagnetic body, the at least one annular plug covering the uncovered surface of the at least one coil;
   wherein the at least one annular plug and the surface of the ferromagnetic body are re-machined to obtain a flat surface,
   wherein the annular plug and the surface of the ferromagnetic body which are left uncovered by the protective annular support and the protective annular support are covered by a protective coating, and wherein the flat surface of the ferromagnetic body and the annular plug covered by the protective coating are uncovered and configured to face the armature of the rotor.

2. The bearing according to claim 1, wherein the protective coating comprises nickel.

3. The bearing according to claim 2, wherein the coating is formed by electroless-nickel plating.

4. The bearing according to claim 3, wherein the at least one annular plug comprises magnetic material selected from the group consisting of ferromagnetic material, magnetic stainless steel, and nickel base alloy.

5. The bearing according to claim 3, further comprising a rotor armature in the form of a disk secured to the rotor, and wherein the stator magnetic circuit is facing the rotor armature.

6. The bearing according to claim 5, wherein the rotor and the rotor armature are, in use, in contact with at least one of a fluid and a gaseous atmosphere, that is at least one of corrosive, acidic, and carrying particles.

7. The bearing according to claim 6, wherein the at least one annular plug is brazed to the at least one coil.

8. The bearing according to claim 7, wherein the at least one annular plug has a U section with a radial web and two axial flanges.

9. The bearing according to claim 2, wherein the coating comprises nickel and phosphorus.

10. The bearing according to claim 1, wherein the at least one annular plug comprises magnetic material selected from the group consisting of ferromagnetic material, magnetic stainless steel, and nickel base alloy.

11. The bearing according to claim 1, wherein the bearing is an axial magnetic bearing.

12. The bearing according to claim 1, further comprising a rotor armature in the form of a disk secured to the rotor, and wherein the stator magnetic circuit is facing the rotor armature.

13. The bearing according to claim 12, wherein the rotor and the rotor armature are, in use, in contact with at least one of a fluid and a gaseous atmosphere, that is at least one of corrosive, acidic, and carrying particles.

14. The bearing according to claim 1, wherein the at least one annular plug is brazed to the at least one coil.

15. The bearing according to claim 1, wherein the at least one annular plug has a U-shaped cross section with a radial web and two axial flanges.

16. The bearing according to claim 1, wherein the annular plug has a thickness greater than a thickness of the protective annular support.

17. The bearing according to claim 1, wherein a thickness of the protective coating ranges from about 1 nm to about 10 μm.

18. A rotary machine, comprising:
a rotor including an armature; and
a bearing comprising:
    a stator magnetic circuit secured to a stationary support device, the stator magnetic circuit comprising at least one coil and a ferromagnetic body placed in a protective annular support, the protective annular support leaving uncovered a surface of the ferromagnetic body and a surface of the at least one coil; and
    at least one annular plug disposed within the ferromagnetic body, the at least one annular plug covering the uncovered surface of the at least one coil;
    wherein the at least one annular plug and the surface of the ferromagnetic body are re-machined to obtain a flat surface,
    wherein the annular plug and the surface of the ferromagnetic body which are left uncovered by the protective annular support and the protective annular support are covered by a protective coating, and
    wherein the flat surface of the ferromagnetic body and the annular plug covered by the protective coating are uncovered and facing the armature of the rotor.

19. A method for manufacturing a bearing comprising a stator magnetic circuit secured to a stationary support device, the stator magnetic circuit comprising at least one coil and a ferromagnetic body placed in a protective annular support, the protective annular support leaving uncovered a surface of the ferromagnetic body and a surface of the at least one coil, the method comprising:
a) welding at least one annular plug to the at least one coil and/or to the ferromagnetic body;
b) re-machining the at least one annular plug and the surface of the ferromagnetic body which is left uncovered by the protective annular support to obtain a flat surface; and
c) coating the at least one annular plug, the protective annular support, and the surface of the ferromagnetic body which is left uncovered by the protective annular support with a protective layer.

* * * * *